Aug. 4, 1953     S. H. BLOCH ET AL     2,647,329
TACHISTOSCOPIC DEVICE
Filed March 12, 1951     2 Sheets-Sheet 1
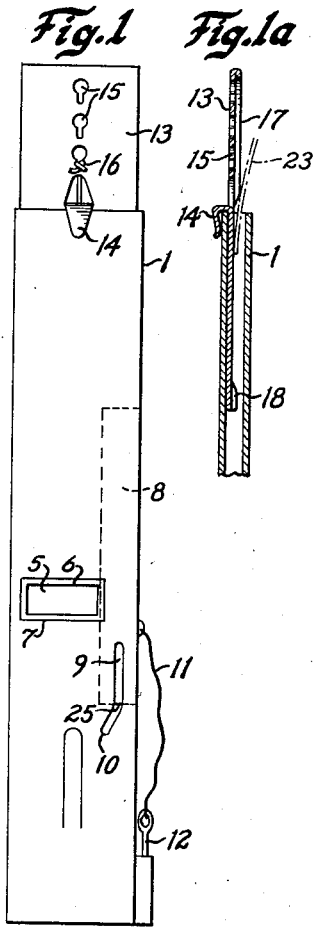
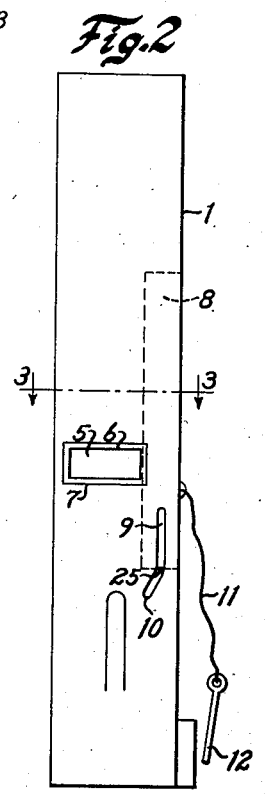
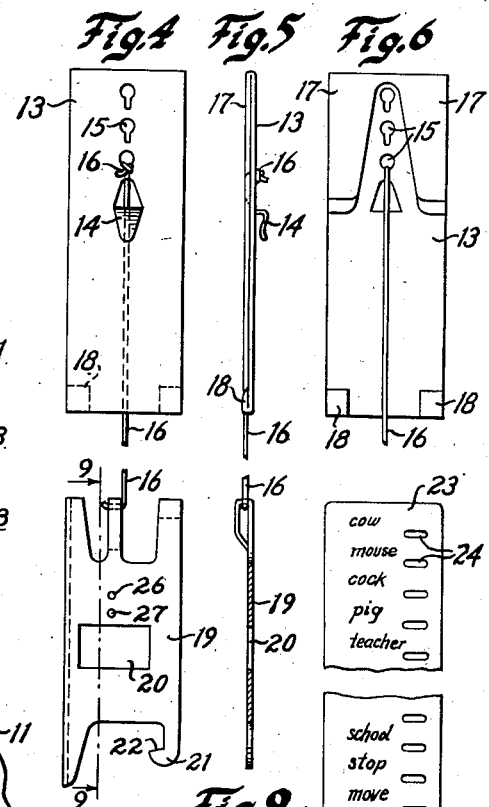
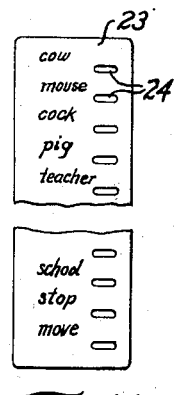
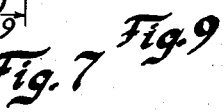
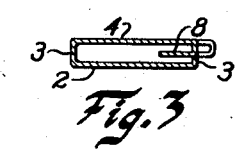
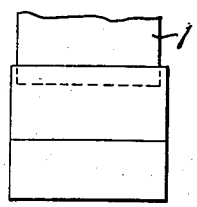
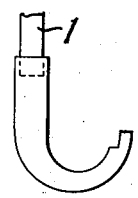
INVENTORS
Sven Hyman Bloch
Eli Gylling
BY
ATTORNEY Aug. 4, 1953 S. H. BLOCH ET AL 2,647,329
TACHISTOSCOPIC DEVICE
Filed March 12, 1951 2 Sheets-Sheet 2
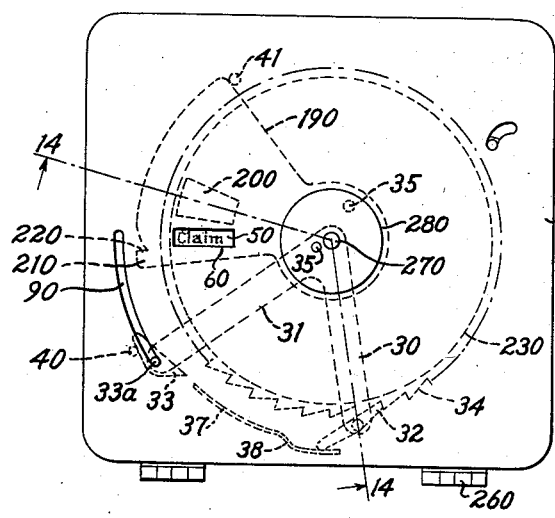
Fig.13
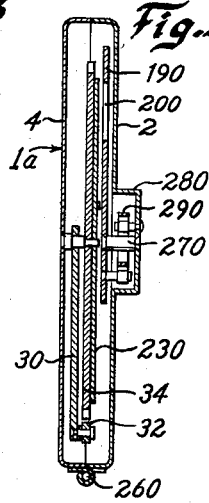
Fig.14
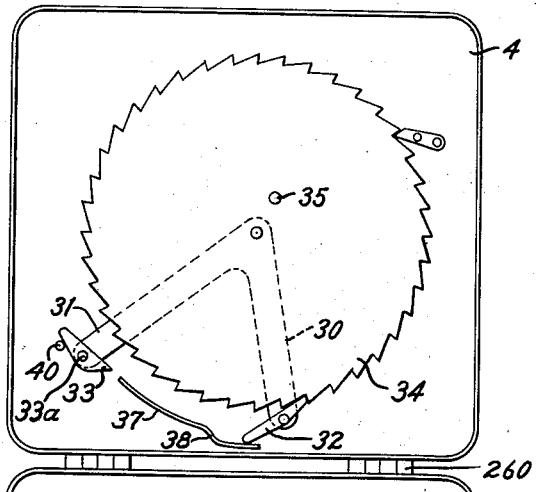
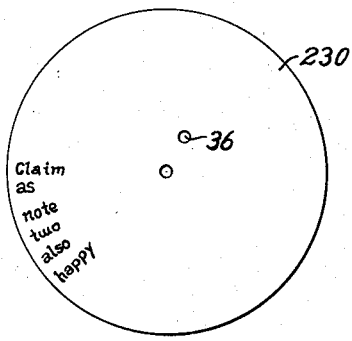
Fig.16
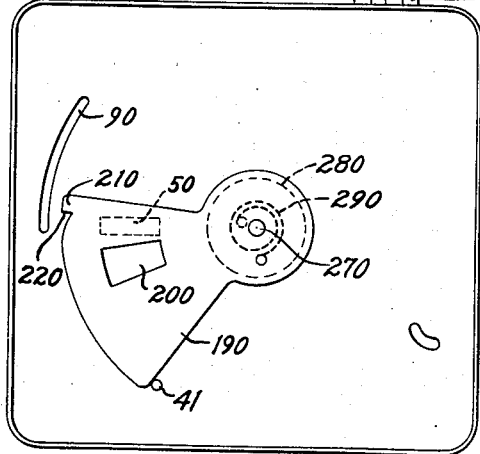
Fig.15
INVENTORS
Sven Hyman Bloch
Eli Gylling
BY
ATTORNEY Patented Aug. 4, 1953

2,647,329

UNITED STATES PATENT OFFICE 2,647,329

TACHISTOSCOPIC DEVICE

Sven Heymann Bloch and Eli Gylling, Skodsborg, Denmark; said Bloch assignor to said Gylling Application March 12, 1951, Serial No. 215,162
In Denmark March 14, 1950

4 Claims. (Cl. 35—35)

The present invention relates to a tachistoscopic device, which is a device in which a series of small designs, such as letters forming words or phrases or small sentences can be displayed for a predetermined short period of time, for instance 1/20 second, within a predetermined displaying area upon which an observer may concentrate his attention before and during the exposure. Such devices can be used in teaching children and adults to read in a suitable manner by permitting an appropriate speed of reading or it can be used in psychological determinations or analyses.

Tachistoscopic devices may also be used for amusement purposes.

The object of exposing a whole word or a small series of words simultaneously for a short time may be an educational one, to develop suitable habits in reading. Thus, it is desirable that a reader recognize and identify small and common words and phrases as a whole. This increases reading ability and speed of reading; the meaning to be conveyed to the reader is as far as possible connected to a word picture so that the reader does not need to build up the word in his mind by combining the individual letters or syllables. In psychological determinations or analyses it is also in some cases of interest to determine how long an exposure, or how many repetitions of a predetermined short exposure, of a given word picture is necessary to convey the meaning of the word to a person.

Many forms of tachistoscopic devices for collective teaching are known in which the word picture is projected on a screen by optical means or in which plates carrying the word picture thereon in a suitable size can be displayed to several observers at a time for a predetermined short period.

Such apparatus are relatively bulky and they are often expensive and normally quite unsuitable for individual teaching. Furthermore, they do not duplicate the normal reading situation, since the letters are displayed in much greater size than the usual book types and at a greater distance, whereas the position of the pupil during the display differs from the position of the pupil when reading a book. Such tachistoscopic devices present other disadvantages; in some cases the display is not momentary but the text is moved opposite the reading direction across a field making its appearance on the right and disappearance on the left. The use of such apparatus is objectionable since the habit of reading a text letter by letter or syllable by syllable may be developed in the students, whereas the opposite habit of recognizing common word pictures or phrase pictures as a whole is desirable.

One object of our present invention is to provide a tachistoscopic device which is cheap, small, easy to operate and adapted to be used by individual pupils. It is a further object to provide a tachistoscope the reading of which takes place under conditions similar to normal reading conditions in that it permits the use of letters of the size of ordinary book types printed on ordinary materials and illuminated in the normal manner.

A still further object is to provide an apparatus of the kind described, the operation of which is mechanical and thus utilizes the inclination of the children for playing with mechanical toys. At the same time, however, the apparatus is so simple in its operation that it does not detract from the interest of the operation which the teacher desires the child to carry out. It does not contain a multitude of screws, adjusting means or accessible mechanical parts, and the most appealing thing to do with it is to use it as intended.

Still another object of the invention is to provide a tachistoscopic device in which the time of exposure can be readily varied within predetermined limits, in which the momentary display of the individual word pictures can be repeated and in which the word picture that has been momentarily displayed will normally show itself afterwards for a longer time to permit its positive identification.

A further object of the invention is to provide an apparatus of the kind referred to in which the change of the word picture to be momentarily displayed is effected automatically in a mechanical way so that the pupil will not know in advance the word to be displayed. Other objects and purposes will appear from the following description.

With these general statements of objects and purposes of our invention we will now proceed to describe embodiments thereof and the manner in which our invention is carried out; it will be understood that while we have described what may be considered preferred embodiments of our invention we do not limit ourselves to the precise conditions or proportions herein set forth as these may be varied by those skilled in the art in accordance with the particular purposes for which they are intended and the conditions under which they are to be utilized.

The invention will now be described with reference to the accompanying drawing, in which Fig. 1 shows a front elevation of one embodiment of the invention, Fig. 1a shows a fragmentary sectional view of the upper portion of the device.

Fig. 2, a front elevation of a part of the same embodiment comprising the screen plate and the means for enclosing the picture sheet, Fig. 3 shows a section taken along the line III—III of Fig. 2, Fig. 4 shows a front view of the top member of the embodiment according to Fig. 1, Fig. 5 shows an end view and Fig. 6, rear view of the same, Fig. 7 shows a front view of the diaphragm member used in the embodiment illustrated in Fig. 1, Fig. 8 shows the same in end elevation, Fig. 9 shows the same in side elevation, Fig. 10 shows front view of a picture sheet to be used in the embodiment illustrated in Fig. 1, Figs. 11 and 12 show rear and side views of an extension member for attachment to the bottom of the casing in the embodiment illustrated in Fig. 1, Fig. 13, front view of another embodiment of the invention, Fig. 14 is a section taken along line XIV—XIV of Fig. 13, Fig. 15 shows the embodiment illustrated in Fig. 13 in front view in an opened condition to display the interior parts thereof, and Fig. 16 shows a picture sheet for the device shown in Fig. 13.

The embodiment of our tachistoscopic device shown in Figs. 1–12 has generally the shape of a casing open at the ends and adapted to enclose a strip of paper, cardboard, Celluloid or other suitable sheet material carrying a series of words or phrases printed on its surface. The strip can be displaced longitudinally within the case. The front plate of the casing forms a screen having a display aperture in it through which the individual word pictures will show when they are not covered by a diaphragm plate slidable longitudinally in the interior of the casing and engaging resilient means secured in the top of the casing. The diaphragm plate has an exposure aperture in it and means are provided so that it can be displaced against the action of the resilient means or released so that it may move upwards under the influence of the resilient means to display the part of the word-carrying sheet behind the display aperture of the front plate or screen plate for a short period of time when the exposure aperture is behind the said display aperture between the front plate and the word-carrying sheet.

The casing 1 is shown separately in Figs. 2 and 3. It has a front or screen plate 2, side plates 3 and a rear plate 4 which is adapted to form a means for enclosing the picture sheet shown separately in Fig. 10 and maintain said sheet movably in its own plane and guide it during its movement in a path which is parallel to the sides 3. The screen plate 2 is adapted to cover generally the surface of the picture sheet but there is provided a display aperture 5 adapted to display an area of the picture sheet which is otherwise covered by the screen plate 2. The display aperture 5 is defined by an edge 6 and surrounded by striping 7, which assists the observer to concentrate upon said aperture 5 even when no word picture is displayed in it. This may be accomplished, however, by other means, for instance by making the diaphragm plate 19, described below, of a color different from the screen plate.

Projecting into the interior of the casing 1 from one of the sides 3 is a shield plate 8 separating partly the part of the casing adapted to receive the picture sheet from the part adapted to enclose the diaphragm plate 19. The casing 1 is, moreover, provided with a slot 9, 10 in the screen plate 2, the upper part 9 of which is parallel to the side 3, the lower part 10 forming an angle thereto. Further, the casing carries a string 11 provided with a pin 12 the point of which is adapted to penetrate into the slot 9, 10.

In the upper end of the casing 1 there is a top member 13 (Fig. 1), which is shown separately in Figs. 4–6. It has on its front surface a hook member 14 by which it is secured to the casing 1 and has three holes 15 to receive the end of an elastic string 16 or other resilient means suitable for the purpose of moving the diaphragm plate within the casing. The three holes 15 can be alternatively used for receiving the end of the string or knots thereon in predetermined places so that the resilient action can be varied. The rear of the top member 13 has projecting parts 17 adapted to guide the picture sheet down into the space behind the shield plate 8, when it is inserted in the casing other projecting parts 18 are provided to receive the impact of the diaphragm member when it has been released to be moved by the attraction of the elastic string 16.

The diaphragm plate 19 is shown separately in Figs. 7–9. It consists of sheet material, for instance sheet metal and has in it a diaphragm aperture 20. The diaphragm plate has a width corresponding to the interior of the casing 1 so that it will move readily along a longitudinal path without lateral movement. The flat shape of the casing 1 guarantees that the movement of the diaphragm plate 19 will take place in its own plane parallel to the surface of the screen plate 2 and adjacent thereto. The upper limit of travel of the diaphragm plate under the functioning of the apparatus is defined by the upper edge of the diaphragm plate impinging the lower edge and projections 18 of the top member 13. The lower limit of travel is defined by the means for moving and releasing the plate. During its movement in its path the projection of the display aperture 5 will cover a certain area on the surface of the diaphragm plate 19 and the diaphragm aperture 20 must be less than this area by at least twice the area of the display aperture 5 to permit the diaphragm plate to cover the display aperture in its upper and lower positions. On the other hand the longitudinal dimension of the diaphragm aperture 20 must be at least of the same size as that of the displaying aperture and preferably greater in order to secure a clean exposition period comprising the whole display aperture 5.

The diaphragm plate 19 is provided at its base with a projection 21 having an edge 22 for engagement with a member for moving the diaphragm plate against the action of the resilient means 16. The moving member consists of the pin 12 which (after the diaphragm plate has been inserted into the casing 1 and the elastic string has been fastened to both the top member 13 and the diaphragm plate) can be inserted through the upper part 9 of the slot 9, 10 the length of which is so adapted that the pin engages the edge 22; the distance between projections 18 of the top member 13 when inserted in the casing 1 to the upper end of the slot 9, is equal to the distance between the upper end of the diaphragm plate 19 and the edge 22. When the pin 12 is moved downwards guided by the slot 9 it takes the diaphragm plate with it thus displaying for a certain time the part of the picture sheet placed behind the display aperture 5. When continuing the movement the part of the diaphragm plate above the diaphragm aperture will close the display aperture. When the pin 12 comes into the oblique part 10 of the slot the engaging point between the point of the pin and the edge 22 will move towards the end of said edge and the said part 10 of the slot ends where the pin has passed along the whole length of said edge 22, whereupon the diaphragm plate 19 is released and moves upwards under the influence of the elastic string 16. During its travel the diaphragm aperture 20 passes the display aperture 5 and a short exposition of the part of the picture sheet 23 occurs.

The picture sheet 23 shown in Fig. 10 is a strip of cardboard or other suitable material of a width corresponding to the interior width of the casing 1, so that it is guided therein when inserted from the upper end. It is capable in this position of a longitudinal movement in its own plane parallel to the screen plate 2 and adjacent to the same. The picture sheet 23 is provided with slots 24 at right angles to the longitudinal edge thereof. The length of these slots corresponds to the length of the lateral movement of the point of the pin 12 when guided by the oblique part 10 of the slot 9—10. The distance between the slots corresponds to the distance between the lower edge 25 of the shield plate 8 and lower end of the slot 10 in a longitudinal direction. The shield plate 8 prevents the point of the pin 12 from engaging the slots during most of its travel along the slot 9 but when the edge 25 of the shield plate has been passed by the pin the point thereof will engage a slot 24 and move the picture sheet longitudinally for the distance corresponding to the distance between two slots. The distance between the word pictures or other pictures to be displayed momentarily corresponds to the distance between the slots 24. Figs. 11 and 12 show an extension to be inserted upon or actuated to the lower end of the casing 1 to guide the picture sheet.

The working of the embodiment of the apparatus will be explained as follows.

After adjusting the elastic string and inserting a picture sheet 23 in the casing 1, the pin 12 is inserted into the slot 9 and carried downwards. When the edge 25 has been passed it engages the picture sheet and eventually a slot therein and carries the picture sheet 23 down to a position defined by one of the slots 24 in the picture sheet in combination with the lower end of the slot 10. The diaphragm plate 19 is released when the pin 12 reaches the end of the slot 10 and moves upwardly at the speed defined by the condition of the elastic string 16. It thereby exposes the field corresponding to the picture sheet and normally the picture sheet will be so designed that some short words are exactly centered in the display aperture 5 during the exposure. When this procedure is repeated the user will have the opportunity during the downward movement of the diaphragm plate of reading and studying the word picture that has just been momentarily displaced. At the lower position of the diaphragm plate 19 the display aperture 5 is again closed during the displacement of the picture sheet. Thus, another word which has not been displayed in advance will be exposed during the upward movement of the diaphragm plate.

If it is desired to show momentarily the same word picture twice the pin is inserted in the lower end of the pin 10 and moved upwardly until it engages the edge 25 after which another exposure is made. The diaphragm plate has points 26 and 27 on it which will show just before the exposure takes place in order to mark the observation point and warn the observer that an exposure will take place.

In the embodiment shown in Figs. 13–16 the casing 1a has a flat, square shape and its front plate 2 and rear plate 4 are interconnected by hinges 260. The front or screen plate 2 has a display aperture 50 defined by an edge 60 and surrounded by a striping if so desired as in the preceding embodiment. The picture sheet 230 has circular shape and the pictures to be displaced are placed radially as shown in Fig. 16. The diaphragm plate 190 has sector shape and is pivoted upon a pin 270 placed centrally in the screen plate 2 in a projecting box portion 280 in which it is surrounded by a helical spring 290 the two ends of which are connected to the screen plate or box and the diaphragm plate respectively.

Although the movements of the diaphragm plate and the picture sheet could easily be accomplished by means resembling the means used for this purpose in the embodiment described in connection with Figs. 1–12, in which case the angular slot 9, 10 must be replaced by a slot the main part of which is a part of a circle and the slots in the picture sheet corresponding to the slot 24 must be placed radially and the edge 220 of the diaphragm plate must be radial, another set of moving members are preferred which will be described in the following. There is a pin placed centrally in the rear plate 4 upon which is placed a two armed lever 30, 31 the arms of which at their extreme ends carry ratchet levers 32 and 33 respectively. Moreover, upon the same pin there is placed a ratchet wheel 34 the central part of which forms a support for the picture sheet 230 and has for this purpose a driving pin 35 to engage a hole 36 in the picture sheet. The ratchet lever 32 is adapted to engage the ratchet wheel 34 and is acted upon by a spring, not shown, surrounding its pin which is fastened in the arm 30. The ratchet lever 32 has a tail which engages a guiding cam 37 fixed to the rear plate and having such a shape that it will not allow the ratchet lever 32 to engage the ratchet wheel until the tail of the ratchet lever has passed a non-circular part of the guide connecting the two circular parts constituting the remainder of the guide and having different radii. The interconnecting part is so placed that the engagement will take place at a suitable distance before the ratchet lever 33 has been released, the remaining part of the movement of the lever serving to carry the picture sheet forward to display another word. The ratchet lever 33 is placed on a pin 33a of the arm 31 and is acted upon by a spring, not shown, to bring it in contact with the outer edge of the diaphragm plate 190. This edge has in it a recess followed by a projection 210 with an edge 220. The pivot pin 33a of the ratchet 33 penetrates through a slot 90 in the front plate 2. The ratchet lever 33 like the ratchet lever 32 has a tail adapted to engage a pin 40 fixed in the rear plate 4. When the lever is turned clockwise in Fig. 13 the ratchet lever 33 will cam over projection 210 and engage the edge 220 of plate 190. When afterwards the lever is turned anti-clockwise the diaphragm plate will follow, the word behind the display aperture 50 will be shown for a time, the aperture will be covered again, the picture sheet will be shifted when the tail of the ratchet 32 has passed the non-circular interconnecting part 38 of the cam guide 37 and finally the pin 40 will engage the tail of the ratchet lever 33 and clockwise movement of the diaphragm plate 190 under the action of the spring 290 will take place until the diaphragm plate impinges a stop 41 (Fig. 13). From this position it can be fetched again by the ratchet lever 33 and so on.

This embodiment has the same performances as the one first described.

We claim:

1. A tachistoscopic device comprising a screen plate having a displaying aperture adapted to display an area of a picture carrying surface of which the balance is covered by said screen plate, said area being adapted to contain a series of letters in book letter size forming at least one word, a diaphragm plate displaceable relative to the screen plate, means for guiding the displacement thereof in a defined path in its own surface adjacent and parallel to the screen plate, edges in the diaphragm plate circumferating an exposition aperture positioned within the area of the diaphragm plate covered during the movement of the same in its defined path by the projection of the displaying aperture and being smaller than the said area by at least twice the area of the displaying aperture and having in the direction of its movement a larger dimension than the dimension of the displaying aperture in the same direction, resilient means adapted to move the diaphragm plate from a starting position in which the projection of the displaying aperture is on one side of the exposition aperture to a final position in which said projection is on the other side of said aperture, means for moving said diaphragm plate by hand in its path against the action of said resilient means from the final position to the starting position, means for releasing said moving means when the starting position has been attained thus allowing the diaphragm plate to be moved from the starting position to the final position by the resilient means, means for enclosing a picture sheet having at least one picture surface containing a number of pictures and maintain said sheet movably along a defined surface a part of which is positioned behind the displaying aperture adjacent and parallel to the screen plate and guided during its movement in a path which carries the pictures successively through the projection of the displaying aperture and means for stepwise advancing the sheet.

2. A tachistoscopic device comprising a screen plate having a displaying aperture adapted to display an area of a picture carrying surface of which the balance is covered by said screen plate, said area being adapted to contain a series of letters in book letter size forming at least one word, a diaphragm plate displaceable relative to the screen plate, means for guiding the displacement of the diaphragm plate in a defined path in its own surface adjacent to and parallel to the screen plate, edges in the diaphragm plate circumferating an exposition aperture positioned within the area of the diaphragm plate covered during the movement of the same in its defined path by the projection of the displaying aperture upon the diaphragm plate and being smaller than the said area by at least twice the area of the displaying aperture and having in the direction of its movement a larger dimension than the dimension of the displaying aperture in the same direction, a projection on said diaphragm plate having an edge perpendicular to the direction of the movement, resilient means adapted to move the diaphragm plate from a starting position in which the projection of the displaying aperture is on one side of the exposition aperture to a final position in which said projection is on the other side of said aperture, means for moving said diaphragm plate by hand in its path against the action of said resilient means from the final position to the starting position said moving means comprising a member engaging the said edge, means for releasing said moving means when the starting position has been attained, means for enclosing a picture sheet having at least one picture surface containing a number of pictures and maintain said sheet movably along a defined surface a part of which is positioned behind the displaying aperture adjacent and parallel to the screen plate and guided during its movement in a path which carries the pictures successively through the projection of the displaying aperture and means for stepwise advancing the sheet.

3. A tachistoscopic device comprising a screen plate having a displaying aperture adapted to display an area of a picture carrying surface of which the balance is covered by said screen plate, said area being adapted to contain a series of letters in book letter size forming at least one word, a diaphragm plate displaceable relative to the screen plate, means for guiding the displacement of the diaphragm plate in a defined path in its own surface adjacent to and parallel to the screen plate, edges in the diaphragm plate circumferating an exposition aperture positioned within the area of the diaphragm plate covered during the movement of the same in its defined path by the projection of the displaying aperture upon the diaphragm plate and being smaller than the said area by at least twice the area of the displaying aperture and having in the direction of its movement a larger dimension than the dimension of the displaying aperture in the same direction, a projection on said diaphragm plate having an edge perpendicular to the direction of the movement, resilient means adapted to move the diaphragm plate from a starting position in which the projection of the displaying aperture is on one side of the exposition aperture to a final position in which said projection is on the other side of said aperture, a pin for moving said diaphragm plate by engaging the point of it with the said edge, edges in the screen plate circumferating a slot, the longitudinal direction of the main part of which is parallel to the direction of movement of diaphragm plate and the upper part of which is positioned opposite the edge of the projection of the diaphragm plate when the same is in its final position and the lower part of which is oblique and ends at the end of the said edge in the position which it occupies when the diaphragm plate is in its starting position and the width of the slot being so as to allow the pin to project through it, means for enclosing a picture sheet having at least one picture surface containing a number of pictures and maintain said sheet movably along a defined surface a part of which is positioned behind the displaying aperture adjacent and parallel to the screen plate and guided during its movement in a path which carries the pictures successively through the projection of the displaying aperture and means for stepwise advancing the sheet.

4. A tachistoscopic device comprising a screen plate having a displaying aperture adapted to display an area of a picture carrying surface of which the balance is covered by said screen plate, said area being adapted to contain a series of letters in book letter size forming at least one word, a diaphragm plate displaceable relative to the screen plate, means for guiding the displacement of the diaphragm plate in a defined path in its own surface adjacent to and parallel to the screen plate, edges in the diaphragm plate circumferating an exposition aperture positioned within the area of the diaphragm plate covered during the movement of the same in its defined path by the projection of the displaying aperture upon the diaphragm plate and being smaller than the said area by at least twice the area of the displaying aperture and having in the direction of its movement a larger dimension than the dimension of the displaying aperture in the same direction, a projection on said diaphragm plate having an edge perpendicular to the direction of the movement, resilient means adapted to move the diaphragm plate from a starting position in which the projection of the displaying aperture is on one side of the exposition aperture to a final position in which said projection is on the other side of said aperture, a pin for moving said diaphragm plate by engaging the point of it with the said edge, edges in the screen plate circumferating a slot, the longitudinal direction of the main part of which is parallel to the direction of movement of diaphragm plate and the upper part of which is positioned opposite the edge of the projection of the diaphragm plate when the same is in its final position and the lower part of which is oblique and ends at the end of the said edge in the position which it occupies when the diaphragm plate is in its starting position and the width of the slot being so as to allow the pin to project through it, means for enclosing a picture sheet having at least one picture surface containing a number of pictures and for maintaining said sheet movably in its defined surface a part of which is positioned behind the displaying aperture and another part being positioned behind the slot in the screen plate both parts being adjacent and parallel to the screen plate and a shield plate positioned behind the upper part of the slot in front of the picture sheet and ending at a distance from the lower end of the oblique part of the slot corresponding to the distance between the individual pictures on the picture sheet and slots in the picture sheet adapted to be engaged with the point of the pin below the shield plate, said shield plate leaving the displaying area free.

SVEN HEYMANN BLOCH.
ELI GYLLING.

References Cited in the file of this patent

UNITED STATES PATENTS

| Number | Name | Date |
|---|---|---|
| 2,110,344 | Taylor | Mar. 8, 1938 |
| 2,252,726 | Peck | Aug. 19, 1941 |
| 2,535,243 | Taylor | Dec. 26, 1950 |